US011898720B2

(12) United States Patent
Mandy et al.

(10) Patent No.: US 11,898,720 B2
(45) Date of Patent: Feb. 13, 2024

(54) DOWNLIGHT FIXTURE HOUSING FABRICATION

(71) Applicant: Man-D-Tec, Inc., Scottsdale, AZ (US)

(72) Inventors: Terry Roy Mandy, Paradise Valley, AZ (US); Zhang Jun, Shenzhen (CN); Dalton John Mandy, Scottsdale, AZ (US)

(73) Assignee: Man-D-Tec, Inc., Scottsdale, AZ (US)

( * ) Notice: Subject to any disclaimer, the term of this patent is extended or adjusted under 35 U.S.C. 154(b) by 192 days.

(21) Appl. No.: 17/150,700

(22) Filed: Jan. 15, 2021

(65) Prior Publication Data

US 2021/0215305 A1 Jul. 15, 2021

Related U.S. Application Data

(60) Provisional application No. 62/961,352, filed on Jan. 15, 2020, provisional application No. 62/961,406, filed on Jan. 15, 2020.

(51) Int. Cl.

| | |
|---|---|
| ***F21S 8/02*** | (2006.01) |
| ***F21V 17/12*** | (2006.01) |
| ***F21V 21/04*** | (2006.01) |
| ***F21V 17/10*** | (2006.01) |
| ***F21V 15/01*** | (2006.01) |

(52) U.S. Cl.

CPC .............. *F21S 8/026* (2013.01); *F21V 15/01* (2013.01); *F21V 17/101* (2013.01); *F21V 17/12* (2013.01); *F21V 21/041* (2013.01); *F21V 21/047* (2013.01)

(58) Field of Classification Search

CPC ........ F21S 8/026; F21V 17/101; F21V 17/12; F21V 21/041; F21V 15/01; F21V 21/047

See application file for complete search history.

(56) References Cited

U.S. PATENT DOCUMENTS

| | | | |
|---|---|---|---|
| 1,767,988 | A | 6/1930 | Knapp |
| 2,835,791 | A | 5/1958 | Horwitz |
| 3,189,788 | A | 6/1965 | Cady |
| 3,294,977 | A | 12/1966 | Duncan |
| 3,336,473 | A | 8/1967 | Buzan |
| 3,760,179 | A | 9/1973 | Addington, Jr. |
| 3,808,499 | A | 4/1974 | Edwards |
| 4,013,993 | A | 3/1977 | Mandel et al. |
| 4,032,828 | A | 6/1977 | Strobl et al. |
| 4,039,822 | A | 8/1977 | Chan et al. |

(Continued)

FOREIGN PATENT DOCUMENTS

| | | | | |
|---|---|---|---|---|
| CN | 105612385 A * | 5/2016 | ............... | F21K 9/17 |
| EP | 0495273 A1 | 7/1992 | | |

(Continued)

OTHER PUBLICATIONS

Installation guide for IP110-F Flush Mount Adapter, Pelco, Inc., Dec. 2008, C2238M, 8 pages.

(Continued)

*Primary Examiner* — Anne M Hines
*Assistant Examiner* — Jose M Diaz
(74) *Attorney, Agent, or Firm* — Mechanicus PLLC

(57) ABSTRACT

A downlight fixture housing fabrication method in which upper and lower downlight fixture housing portions are formed in separate steps and joined by press-fitting, a bonding agent, pinning, and/or threaded engagement.

20 Claims, 8 Drawing Sheets

(56) References Cited

U.S. PATENT DOCUMENTS

| | | | |
|---|---|---|---|
| 4,056,757 | A | 11/1977 | Mauch et al. |
| 4,071,749 | A | 1/1978 | Balogh |
| 4,156,891 | A | 5/1979 | Roche |
| 4,218,725 | A | 8/1980 | Heffner et al. |
| 4,223,232 | A | 9/1980 | Bulat |
| 4,234,907 | A | 11/1980 | Daniel |
| 4,241,871 | A | 12/1980 | Newell, III et al. |
| 4,271,621 | A | 6/1981 | Garcia et al. |
| 4,441,143 | A | 4/1984 | Richardson, Jr. |
| 4,504,894 | A | 3/1985 | Reibling |
| 4,520,436 | A | 5/1985 | McNair et al. |
| 4,587,597 | A | 5/1986 | Meyers |
| 4,682,078 | A | 5/1987 | Pascilade |
| 4,697,890 | A | 10/1987 | Crookston et al. |
| 4,708,223 | A | 11/1987 | Omdorff et al. |
| 4,727,291 | A | 2/1988 | Bavaria |
| 4,749,908 | A | 6/1988 | Sifter |
| 4,751,398 | A | 6/1988 | Ertz, III |
| 4,802,065 | A | 1/1989 | Minter et al. |
| 4,875,553 | A | 10/1989 | Smith et al. |
| 4,885,663 | A | 12/1989 | Parker |
| 4,890,200 | A | 12/1989 | Mandy |
| 4,905,579 | A | 3/1990 | Dame |
| 4,907,132 | A | 3/1990 | Parker |
| 4,947,291 | A | 8/1990 | McDermott |
| 4,977,818 | A | 12/1990 | Taylor et al. |
| 5,003,432 | A | 3/1991 | Mandy |
| 5,005,108 | A | 4/1991 | Pristash et al. |
| 5,021,928 | A | 6/1991 | Daniel |
| 5,025,349 | A | 6/1991 | Gow |
| 5,123,875 | A | 6/1992 | Eubank et al. |
| 5,145,247 | A | 9/1992 | Mandy |
| 5,161,879 | A | 11/1992 | McDermott |
| 5,253,152 | A | 10/1993 | Yang et al. |
| 5,408,394 | A | 4/1995 | Mandy |
| 5,412,542 | A | 5/1995 | Mandy |
| 5,568,964 | A | 10/1996 | Parker et al. |
| 5,613,751 | A | 3/1997 | Parker et al. |
| 5,618,096 | A | 4/1997 | Parker et al. |
| 5,661,645 | A | 8/1997 | Hochstein |
| 5,739,639 | A | 4/1998 | Johnson |
| 5,850,126 | A | 12/1998 | Kanbar |
| 5,876,107 | A | 3/1999 | Parker et al. |
| 5,894,686 | A | 4/1999 | Parker et al. |
| 5,895,115 | A | 4/1999 | Parker et al. |
| 5,921,652 | A | 7/1999 | Parker et al. |
| 5,921,670 | A | 7/1999 | Shumacher et al. |
| 5,966,069 | A | 10/1999 | Zmurk et al. |
| 6,030,080 | A | 2/2000 | Parker et al. |
| 6,079,838 | A | 6/2000 | Parker et al. |
| 6,158,867 | A | 12/2000 | Parker et al. |
| 6,185,356 | B1 | 2/2001 | Parker et al. |
| 6,609,804 | B2 | 8/2003 | Nolan et al. |
| 6,712,481 | B2 | 3/2004 | Parker et al. |
| 6,752,505 | B2 | 6/2004 | Parker et al. |
| 6,764,196 | B2 | 7/2004 | Bailey |
| 6,827,456 | B2 | 12/2004 | Parker et al. |
| 6,860,628 | B2 | 3/2005 | Robertson et al. |
| 6,872,220 | B2 | 3/2005 | Williams et al. |
| 6,874,925 | B2 | 4/2005 | Page et al. |
| 6,994,457 | B2 | 2/2006 | Lee |
| 7,066,617 | B2 | 6/2006 | Mandy et al. |
| 7,071,625 | B2 | 7/2006 | Cheng et al. |
| 7,077,544 | B2 | 7/2006 | Parker |
| 7,114,829 | B2 | 10/2006 | Lai |
| 7,114,830 | B2 | 10/2006 | Robertson et al. |
| 7,246,926 | B2 | 7/2007 | Harwood |
| 7,261,453 | B2 | 8/2007 | Morejon et al. |
| 7,396,139 | B2 | 7/2008 | Savage |
| 7,486,033 | B2 | 2/2009 | Chen et al. |
| 7,722,227 | B2 | 5/2010 | Zhang et al. |
| 7,896,517 | B2 | 3/2011 | Mandy et al. |
| 8,092,035 | B2 | 1/2012 | Mandy et al. |
| 8,096,672 | B2 | 1/2012 | Mandy et al. |
| 8,558,407 | B2 | 10/2013 | Mandy et al. |
| 9,004,713 | B2 | 4/2015 | Mandy et al. |
| 2004/0125246 | A1 | 7/2004 | Okamori et al. |
| 2005/0190345 | A1 | 9/2005 | Dubin et al. |
| 2006/0038192 | A1 | 2/2006 | Williams |
| 2006/0187654 | A1 | 8/2006 | Jungel-Schmid et al. |
| 2007/0195532 | A1 | 8/2007 | Reisenauer |
| 2007/0242461 | A1 | 10/2007 | Reisenauer et al. |
| 2008/0024010 | A1 | 1/2008 | Romano |
| 2008/0084700 | A1 | 4/2008 | Van de Ven |
| 2008/0192489 | A1 | 8/2008 | Ward |
| 2008/0258628 | A1 | 10/2008 | Higley et al. |
| 2008/0296975 | A1 | 12/2008 | Shakespeare et al. |
| 2009/0290361 | A1 | 11/2009 | Ruud et al. |
| 2011/0044047 | A1 | 2/2011 | Mandy et al. |
| 2011/0299290 | A1 | 12/2011 | Mandy |
| 2012/0187852 | A1 | 7/2012 | Mandy et al. |
| 2018/0135834 | A1* | 5/2018 | Bruchhage .............. F21V 29/89 |
| 2022/0026057 | A1* | 1/2022 | Elmvang ................. F21V 17/02 |

FOREIGN PATENT DOCUMENTS

| | | | |
|---|---|---|---|
| WO | 2003019073 | A1 | 3/2003 |
| WO | 2005098806 | | 10/2005 |
| WO | 2006031350 | A2 | 3/2006 |

OTHER PUBLICATIONS

Search Report from the Intellectual Property Office for German Application No. GB1204033.3, dated Jun. 14, 2012; 1 page.

* cited by examiner

DOWNLIGHT FIXTURE HOUSING FABRICATION

CROSS-REFERENCES TO RELATED APPLICATIONS

This application claims the benefit of priority in U.S. Provisional Patent Application Nos. 62/961,406 and 62/961,352; both filed on Jan. 15, 2020; the entire contents of which are hereby incorporated by reference.

STATEMENT REGARDING FEDERALLY SPONSORED RESEARCH OR DEVELOPMENT

Not Applicable

BACKGROUND

Field

This application relates generally to the manufacture of elevator lighting fixtures.

Description of Related Art Including Information Disclosed Under 37 CFR 1.97 and 1.98

Downlight fixture housings are known to be formed as a single piece via a single process such as die casting. Die castings, however, are subject to innate property imperfections that can interfere with the application of various finishes to the housings. For example, factors such as gasification of impurities (outgassing), shrinkage, and temperature changes, can result in porosity in a diecast fixture housing. These factors may manifest as surface imperfections on the cast part that remain visible even after additional coating or plating processes. This is especially problematic in parts molded in relatively deep-draw single-mold dies commonly used to create downlight fixture housings.

SUMMARY

A downlight fixture housing may be fabricated via a method comprising the steps of fabricating a lower portion of a downlight fixture housing, fabricating an upper portion of the downlight fixture housing, and joining the upper and lower portions to form a single downlight fixture housing. The upper and lower portions may be joined by a press fit, through the use of a bonding agent, and/or by use of a mechanical attachment device.

Alternatively, or in addition, a downlight fixture housing may be fabricated via a method comprising the steps of fabricating a lower portion of a downlight fixture housing, fabricating an upper portion of the downlight fixture housing, joining the upper and lower portions to form a single downlight fixture housing and connecting the lower and upper portions using a mechanical attachment system.

DRAWING DESCRIPTIONS

DETAILED DESCRIPTION

Figure 12:
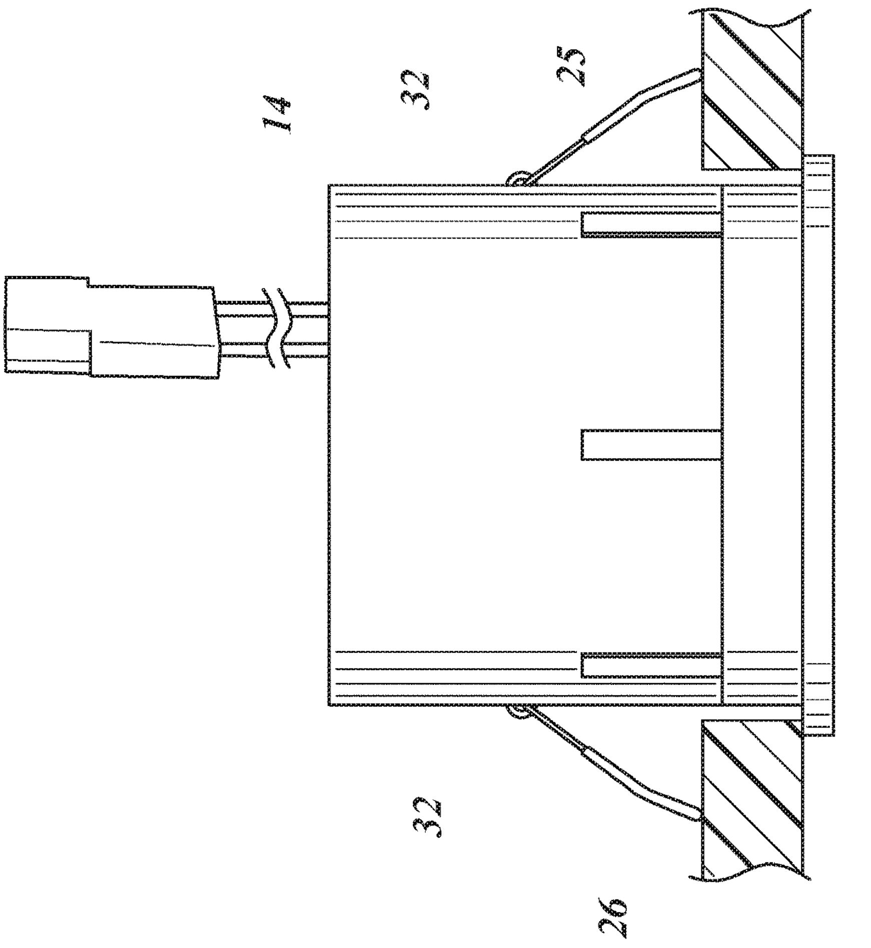
FIG. 12 is a partial cutaway view showing the downlight fixture of FIG. 11 installed in the drop ceiling and supported by the extended spring clip of FIG. 11.
Figure 13:
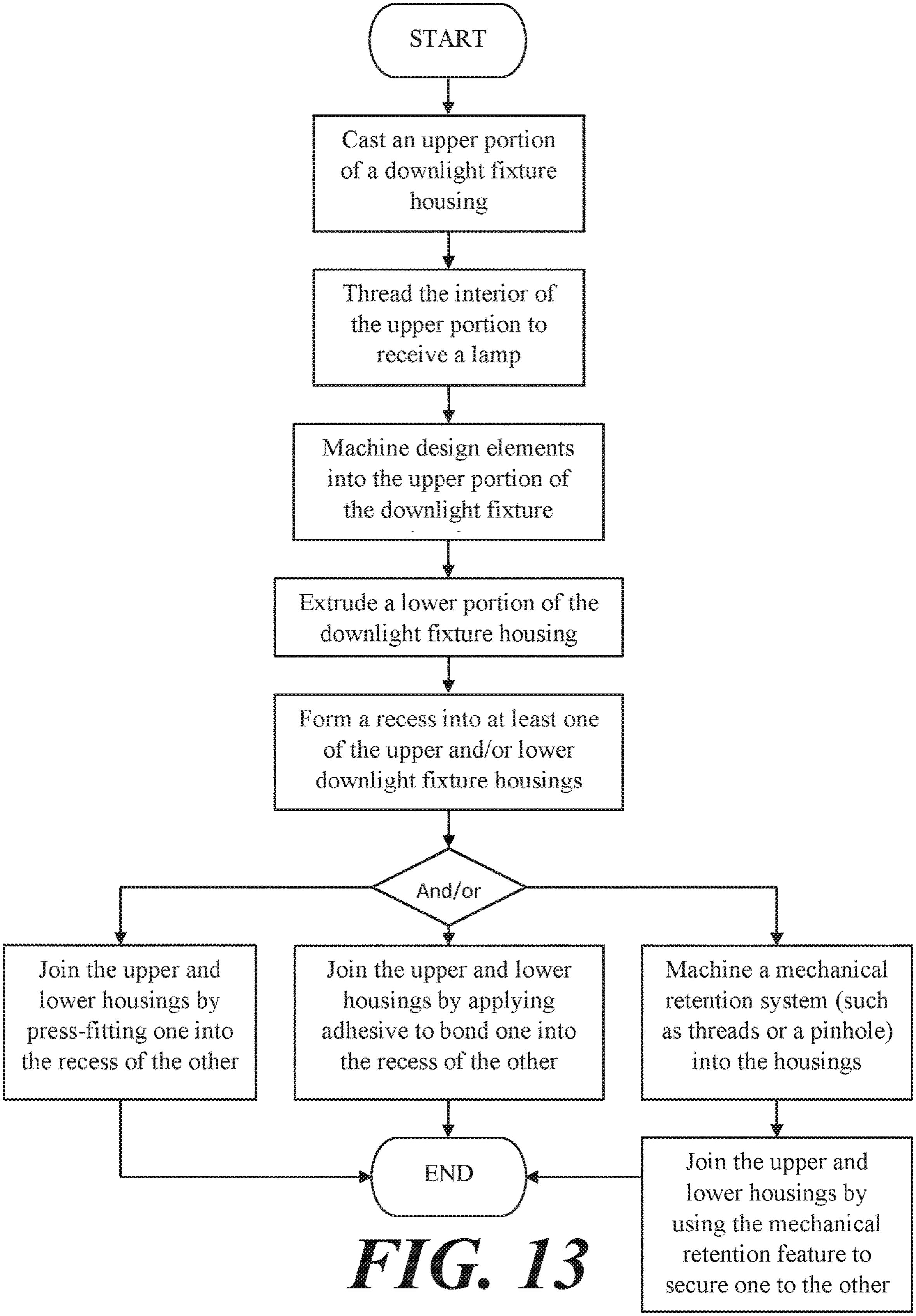
FIG. 13 is a flowchart showing a method for fabricating a downlight fixture housing.

A downlight fixture housing fabrication method is generally shown in the flowchart of FIG. 13. A downlight fixture housing constructed according to the method is generally indicated at 10 in FIGS. 1, 2, and 7-12.

As shown in the flowchart of FIG. 13, the method may include fabricating a lower portion 12 of a downlight fixture housing 10 (best shown in FIGS. 5 and 6), fabricating an upper portion 14 of the downlight fixture housing 10 (best shown in FIGS. 3 and 4), and then joining the upper portion 14 of the downlight fixture housing 10 with the lower portion 12 of the downlight fixture housing 10 to form the downlight fixture housing 10.

Fabrication of the lower portion of the downlight fixture housing 10 may include extruding the lower portion 12 of the downlight fixture housing 10 from, for example, aluminum or brass, i.e., forming the lower portion 12 via a process that includes extrusion. Further features and/or design elements may then be imparted to the lower housing portion 12 via other processes such as threading or machining. The lower portion 12 may also be produced in various depths for aesthetic or practical reasons, and a shallow embodiment of the lower portion is shown at 12' in FIGS. 8-12. These two embodiments of the lower portion 12/12' are functionally similar, and except where specifically disclaimed, any description of lower portion 12 may be assumed to apply to lower portion 12'. The same is true of the embodiment of the downlight fixture housing 10' that includes lower portion 12'.

Figure 7:
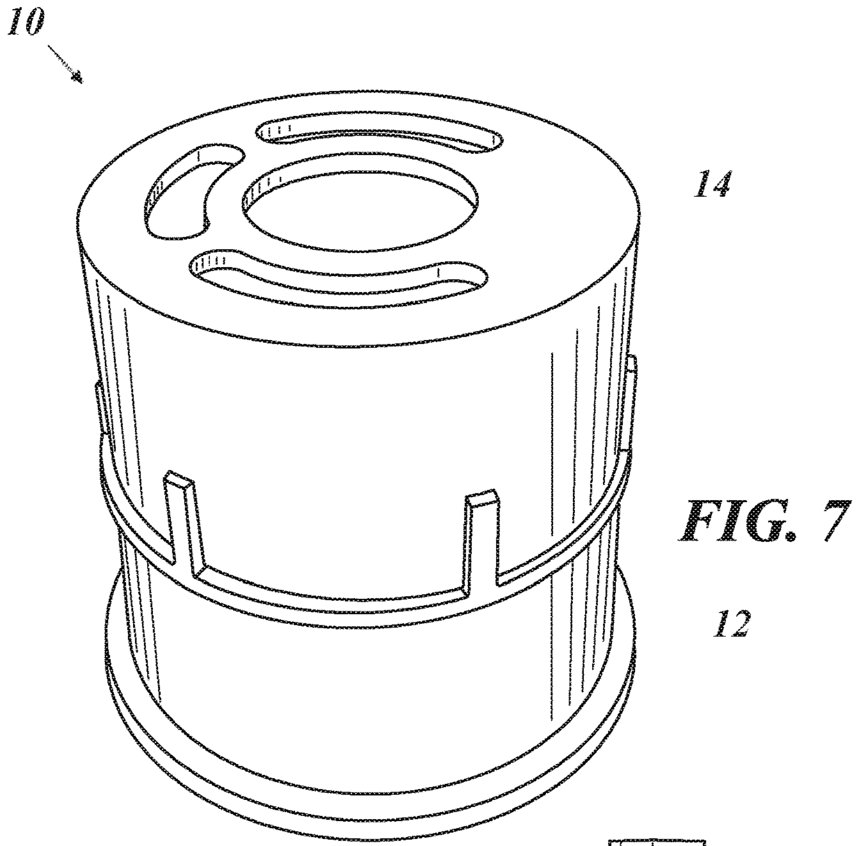
FIG. 7 is a perspective view of the assembled housing portions of FIGS. 3-6.
Figure 8:
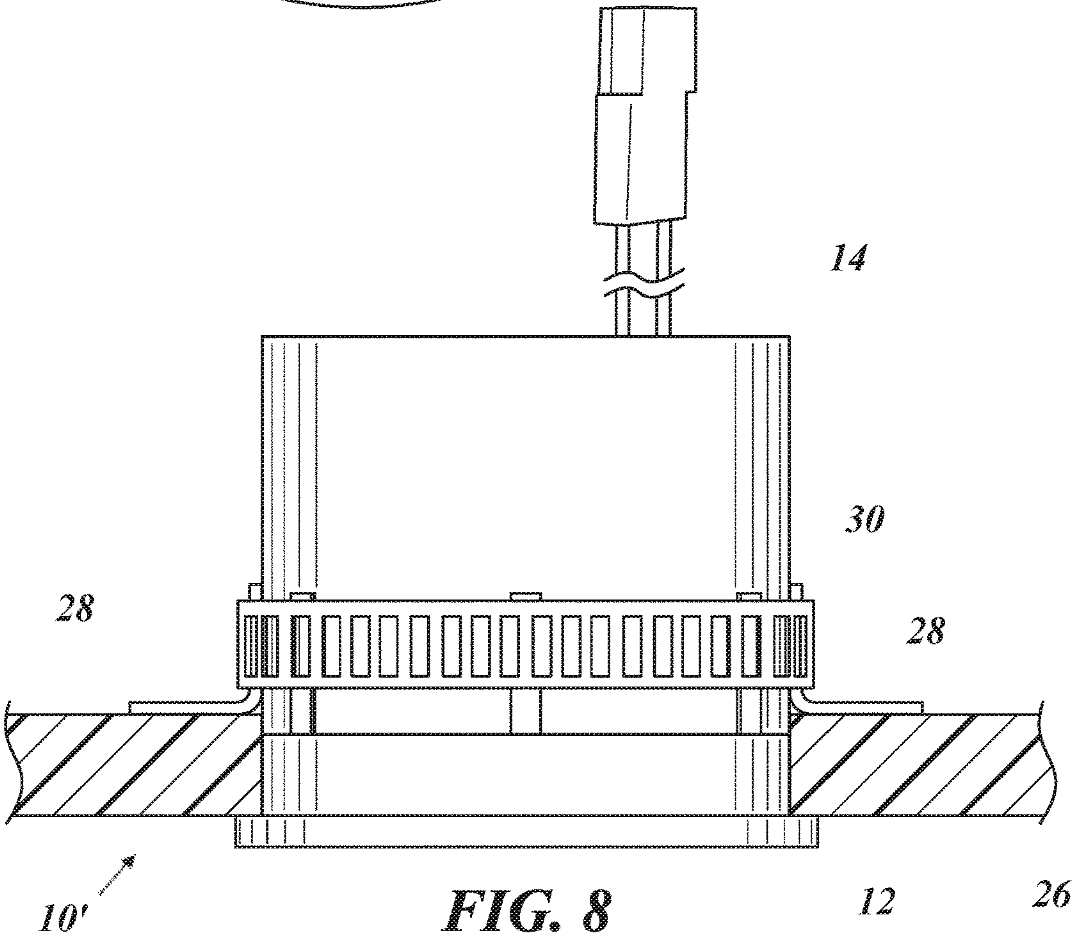
FIG. 8 is a partial cutaway view of an alternate embodiment of the downlight fixture of FIG. 1 including a shallow embodiment of the lower housing of FIGS. 5 and 6, and secured to a drop ceiling via a clamp mount.
Figure 9:
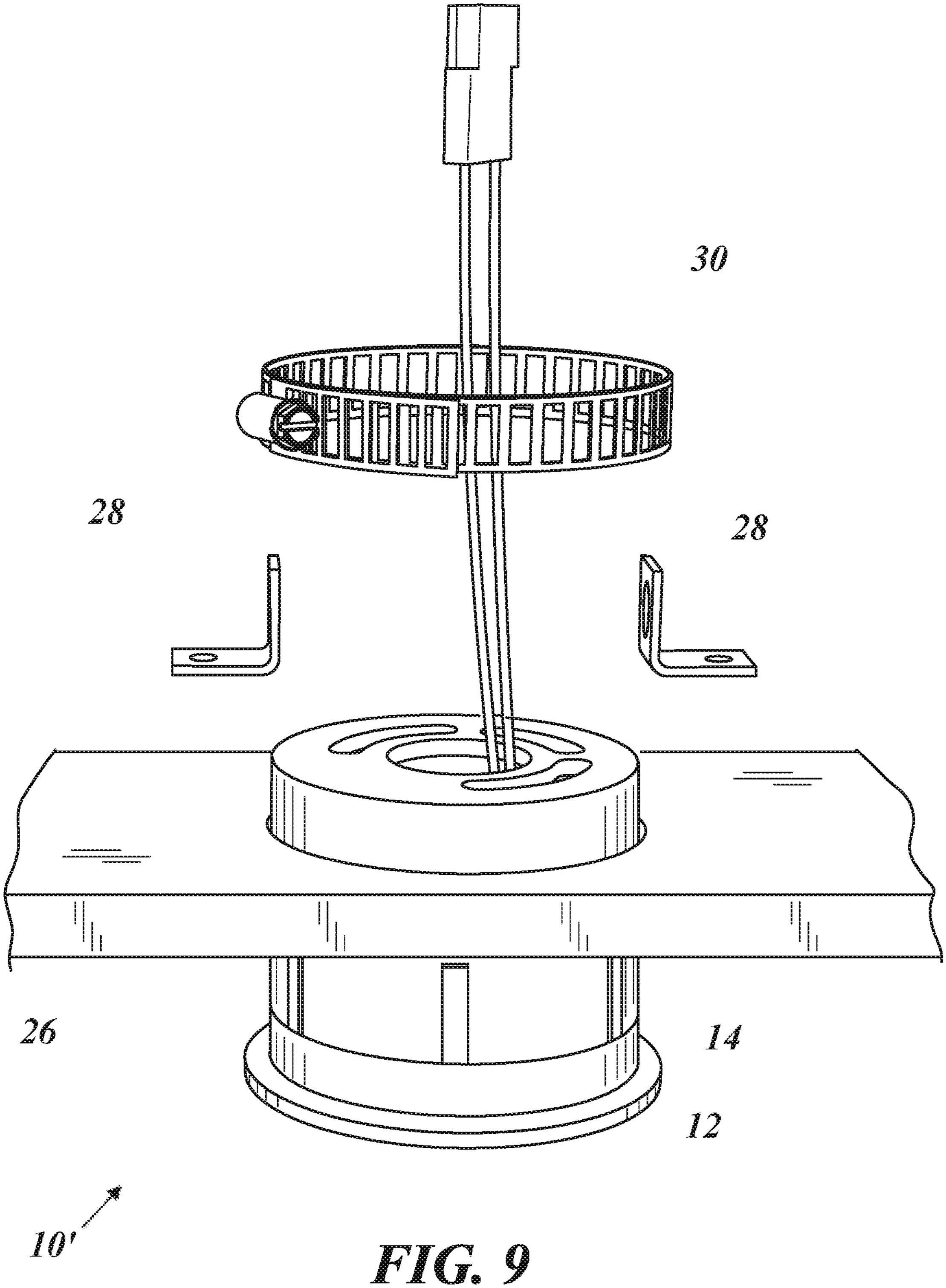
FIG. 9 is a perspective exploded view of the clamp mount of FIG. 8 showing the downlight fixture of FIG. 8 partially installed in the drop ceiling.
Figure 10:
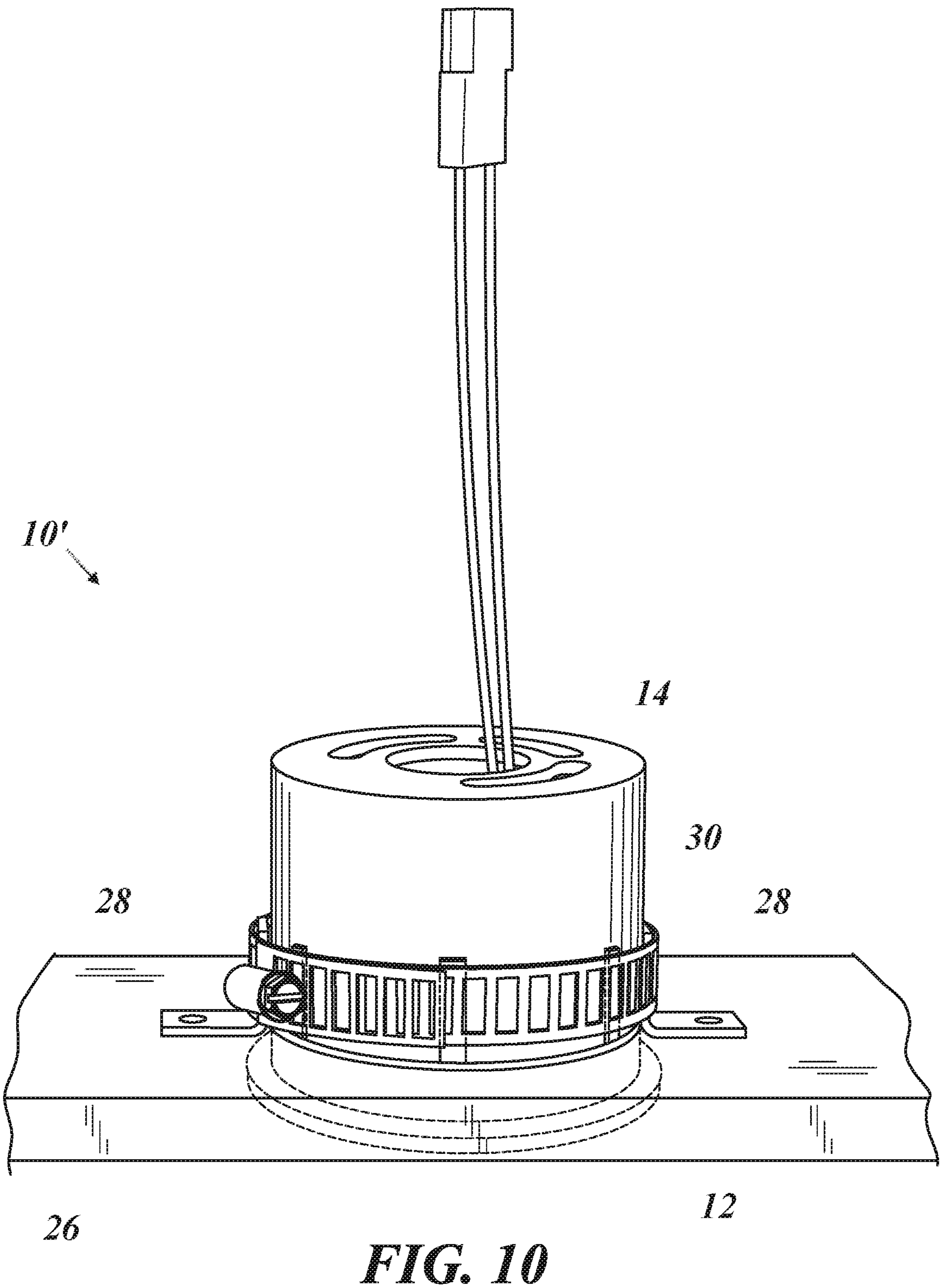
FIG. 10 is a perspective view of the downlight fixture of FIG. 8 installed in the drop ceiling.

Fabrication of the upper portion 14 of the downlight fixture housing 10 may include die casting the upper portion 14 of the downlight fixture housing 10 from, for example, zinc or aluminum, i.e., forming the upper portion 14 via a process that includes die casting. The die casting of the upper portion 14 may include forming the upper portion 14 to include an at least partially closed upper end or "base" 16. The base 16 is best shown in FIG. 7. Further features and/or design elements may then be imparted to the upper housing portion 14 via other processes.

The upper 14 and lower 12 portions may then be joined to form a single downlight fixture housing 10. This joining may be accomplished in any suitable way, depending on how the portions 12, 14 were formed.

Figure 3:
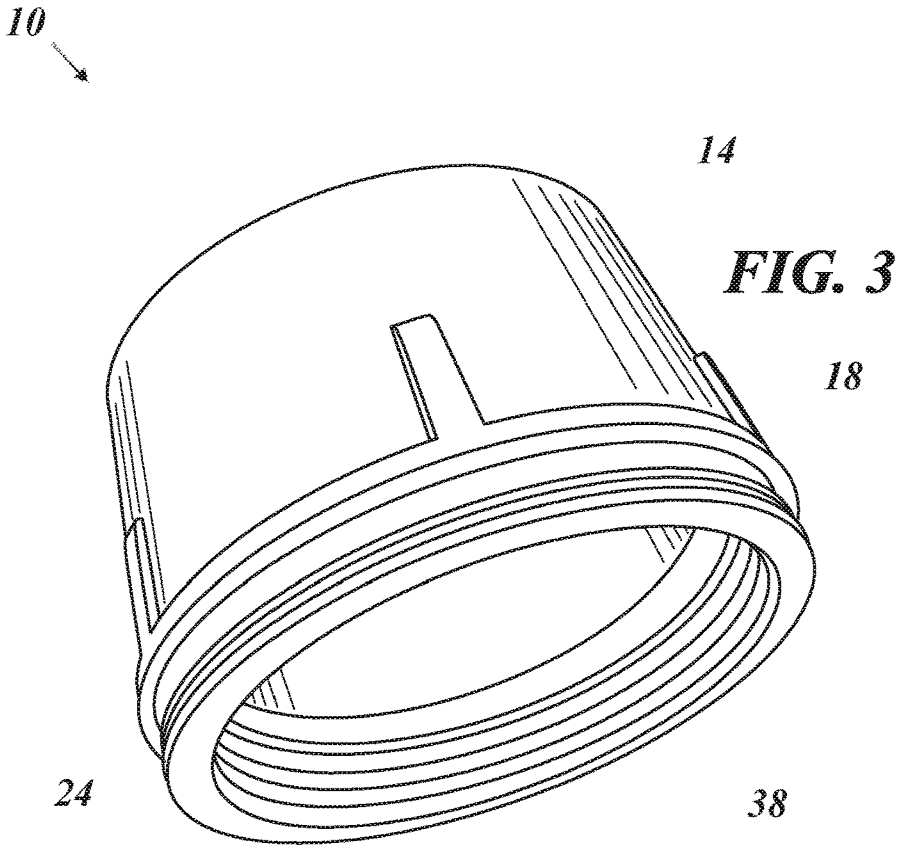
FIG. 3 is a perspective view of an upper housing portion of the fixture of FIG. 1 after exterior threads have been added.
Figure 5:
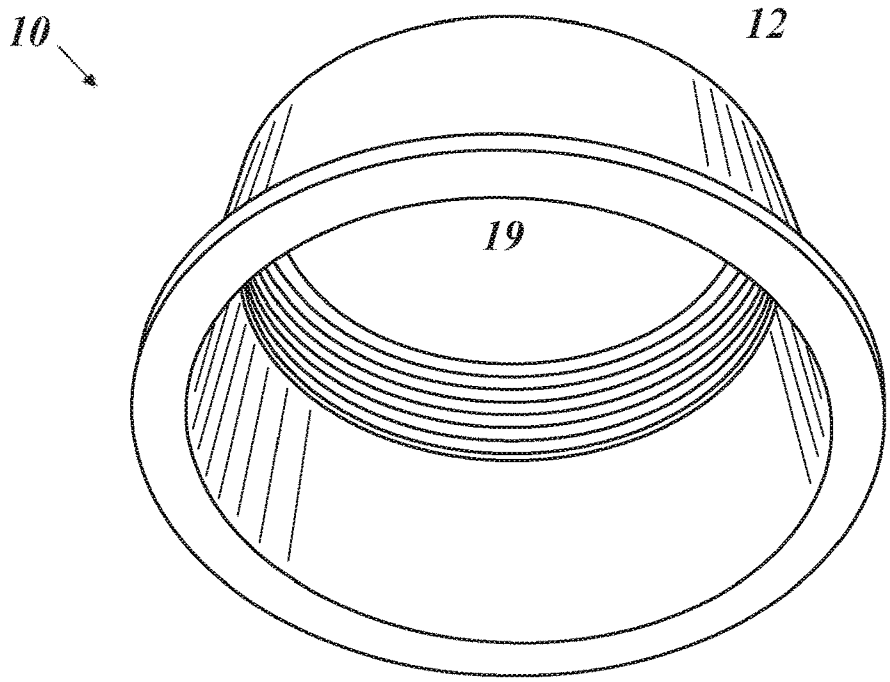
FIG. 5 is a perspective view of a lower housing portion of the fixture of FIG. 1 after interior threads have been added.

For example, during the steps of fabricating the upper 14 and lower 12 downlight fixture housing portions, at least one mechanical attachment system may be formed on one or both housing portions 12, 14. This mechanical attachment system may comprise outer threads 18 formed in an outer circumferential surface at or adjacent a lower end of the upper housing portion 14, as shown in FIG. 3, and corresponding inner threads 19 formed in an inner circumferential surface at or adjacent an upper end of the lower housing portion 12, as shown in FIG. 5. In this example, the upper 14 and lower 12 housing portions may then be removably connected together by threadedly engaging the threads 18 of the lower end of the upper housing portion 14 with the threads 19 of the upper end of the lower housing portion 12.

Figure 4:
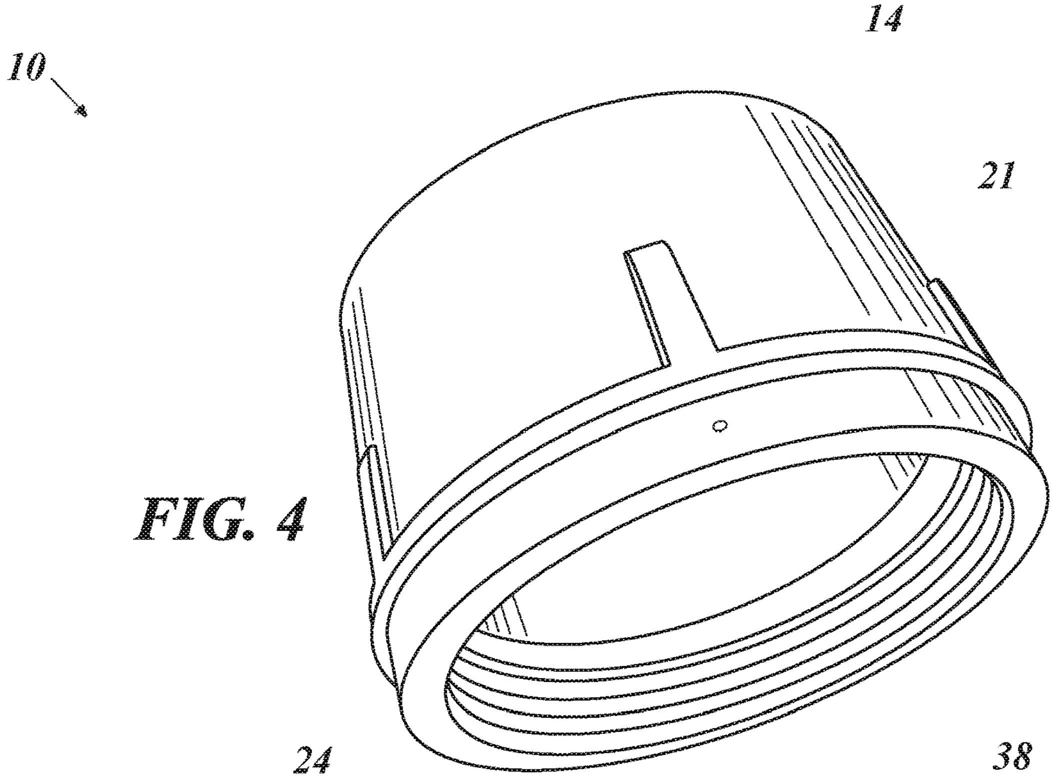
FIG. 4 is a perspective view of the upper housing portion of FIG. 3 before exterior threads are added.
Figure 6:
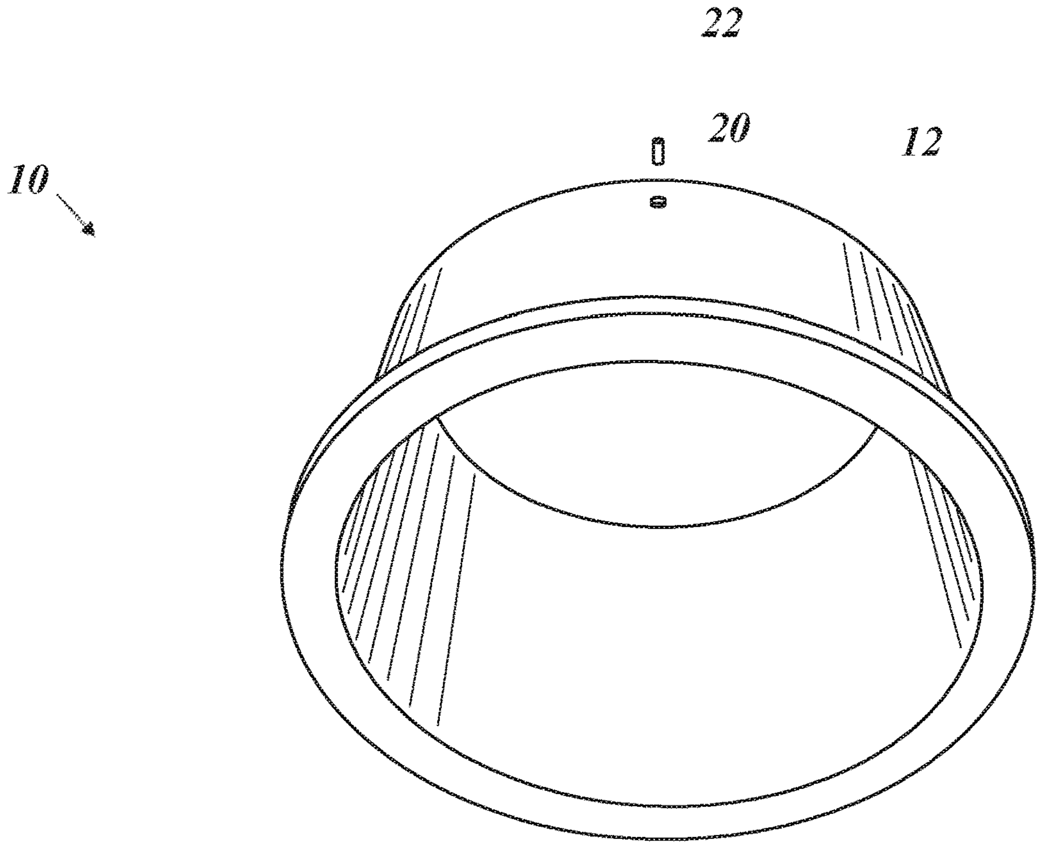
FIG. 6 is a perspective view of the lower housing portion of FIG. 5 before interior threads have been added.

Alternatively, or additionally, the mechanical attachment system may comprise at least one pinhole formed in one or both housing portions. For example, a pin through-hole 20 may be formed in the lower housing portion 12 as shown in FIG. 6, while a shallower pinhole 21 may extend part-way through the upper housing portion 14 as shown in FIG. 4. In this example, the step of connecting the upper and lower housing portions 14, 12 together may comprise inserting a pin 22 through the upper and lower housing pinholes 21, 20 such that the pin 22 resists any attempt to part the upper and lower housing portions 14, 12. However, the housing portions 12, 14 may alternatively be joined by providing a pinhole 20 in only one of the housing portions if the pin 22 is jammed through with sufficient force to hold the housing portions 12, 14 together by friction or deformation.

Alternatively, or additionally, the joining process of the upper and lower housing portions 14, 12 may include machining a recess sleeve 24 on at least one of the upper or lower housing portions 14, 12. For example. a recess sleeve 24 is shown on the upper housing portion 14 in FIG. 4, which allows the lower housing portion 12 to be received in the recess sleeve 24, so that the upper and lower housing portions 14, 12 may be bonded together to form a single downlight fixture housing 10. The recess sleeve 24 may be formed by any suitable means, including by die casting, and the recess sleeve 24 may be formed in either or both of the housing portions 14, 12.

Bonding may be achieved by any suitable method to include press fitting, introduction of a bonding agent or adhesive, and/or the pinning and/or threading methods shown above. Multiple attachment means may also be used at once, for example the housing portions 12, 14 may be press fitted, pinned, and glued together.

Figure 11:
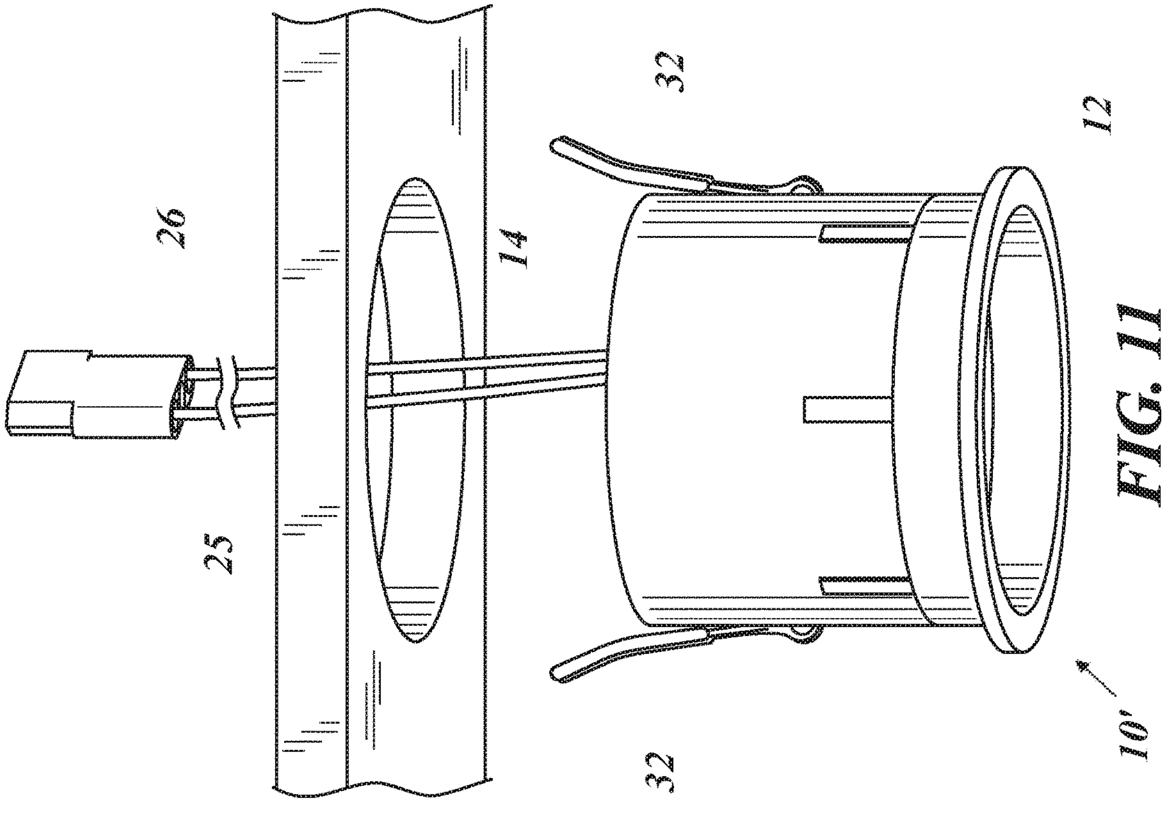
FIG. 11 is a perspective view showing the downlight fixture of FIG. 8 before insertion into a drop ceiling and including a spring clip mount retracted to allow the fixture to pass through a hole in the drop ceiling.

One or more downlight mounts may be attached to the upper portion 14 or lower portion 12 of the downlight fixture housing 10 to permit the downlight to be installed in an opening 25 of a surface 26 such as a drop ceiling as shown in FIGS. 8-12. Any suitable mount may be used, including, for example, the L brackets 28 shown secured to the housing 10 via a clamp 30 in FIGS. 8-10, or spring clips 32 configured to be retracted as the housing 10 is inserted through the opening 25 in the surface 26, as shown in FIG. 11, then spring out to hold the housing 10 in place, as shown in FIG. 12.

The downlight housing 10 may be installed and supported on the surface 26 in a position that permits the removal of the lower portion 12 from the upper portion 14 without dismounting the remainder of the downlight from the surface 26. In the examples of FIGS. 8-12, this is accomplished by securing the brackets 28 and clamp 30, or the spring clips 30, to the upper housing portion, 14 allowing the lower housing portion 12 to be removed.

Figure 2:
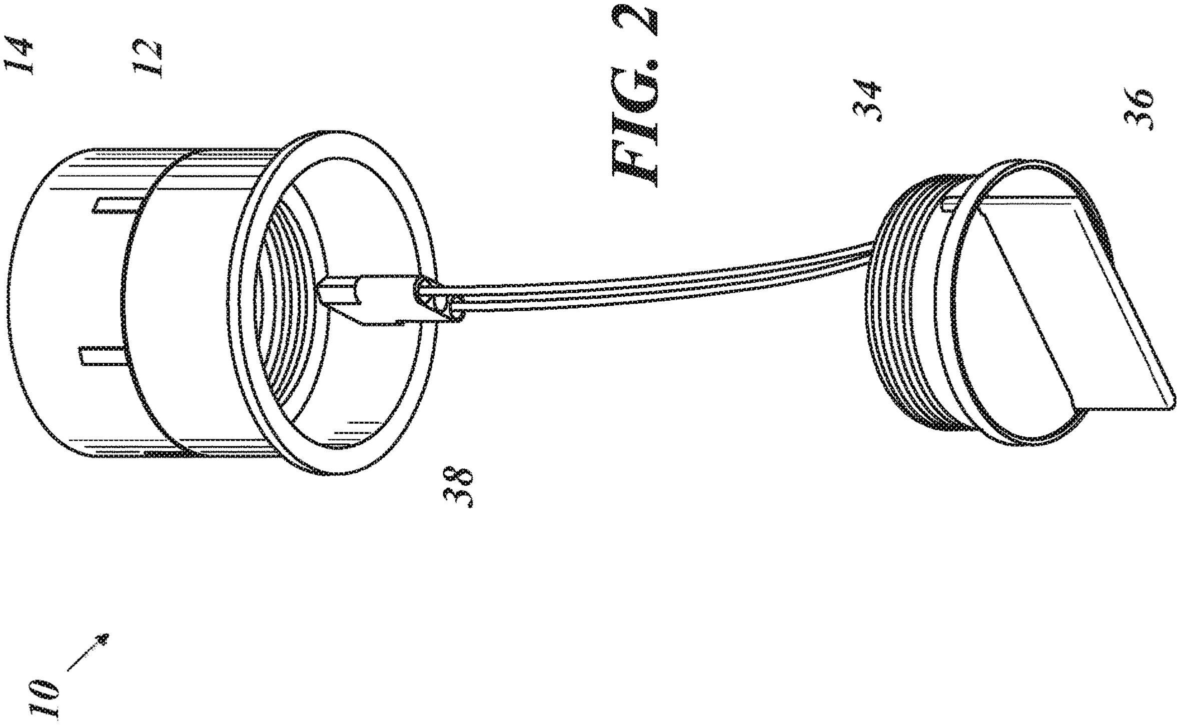
FIG. 2 is a perspective view of the downlight fixture of FIG. 1 showing the lamp removed via an extraction tool.
Figure 1:
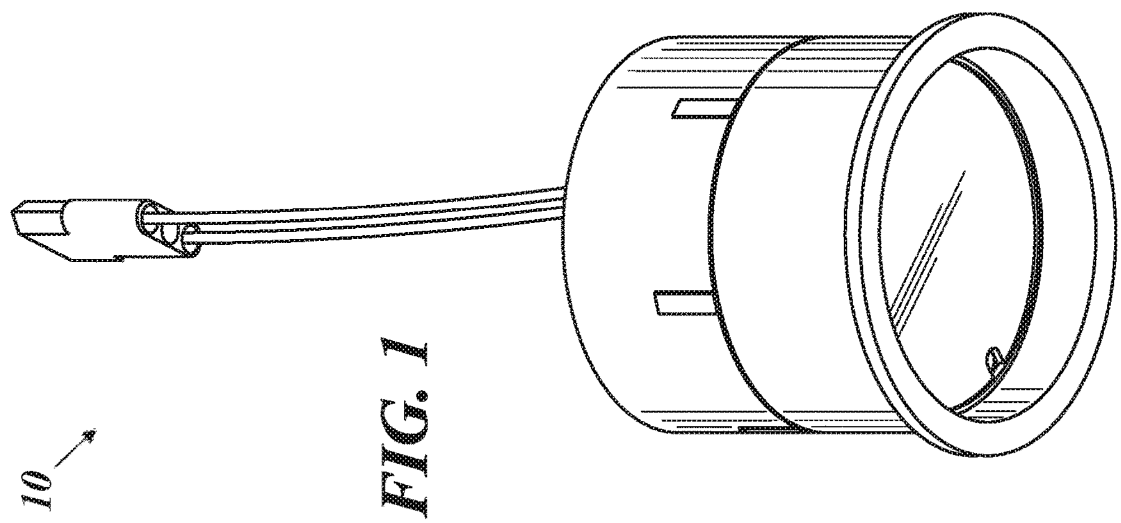
FIG. 1 is a perspective view of a downlight fixture with an installed lamp.

A lamp 34 may be installed or removed from the downlight housing 10 as shown in FIGS. 1 and 2. The exemplary lamp shown in the figures is a standard Man-D-Tec LED module, removable via an extraction tool 36 as shown in FIG. 2, but any suitable lamp 34 may be used. To allow the installation of a lamp 34, the step of fabricating the upper portion 14 of the downlight fixture housing 14 may additionally comprise forming a lamp mount 38 (shown in FIGS. 2-4) within the upper portion 14, the lamp mount 38 being shaped to removably receive the lamp. In the example shown in FIGS. 1 and 2, the lamp mount 38 comprises interior threads formed into the upper housing portion and compatible with the LED module example of the lamp 34.

To allow for simple repairs and replacements, the step of fabricating the lower portion 12 of the downlight fixture housing 10 may additionally comprise forming the lower portion 12 to have sufficient clearance so that the lamp 34 may pass through the lower portion 12, to be received or removed from the upper portion 14 after the upper and lower portions 14, 12 are attached, and without detaching the upper and lower portions 14, 12, as shown in FIGS. 1 and 2. This should also allow the lower portion 12 to be attached and detached from the upper portion 14 after the lamp 34 is received by the upper portion 14, and without removing the lamp 34 from the upper portion 14. In other words, the lower housing portion 12 may be replaced without removing the lamp 34, and the lamp 34 may be replaced without removing the lower housing portion 12.

Fabrication of a downlight fixture housing in two portions via two different processes, and/or from two different respective materials, can allow for cost reductions and improvement of a surface finish on one portion of the downlight fixture housing. The finish only needs to be applied to the part of the housing that will be visible when the down light is installed, reducing the costs of applying a finish. Cost is also reduced to customers that wish to be able to change the appearance of a downlight, because they only need to purchase a new lower housing, rather than a whole new downlight. Assembly of the two downlight fixture housing portions via threading allows for the removal of the visible or most visible portion of the housing and replacement of the visible surface without needing to replace, or even dismount, the whole fixture.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A downlight fixture housing fabrication method comprising the steps of:

fabricating a lower portion of a downlight fixture housing;

fabricating an upper portion of the downlight fixture housing; and joining the upper and lower portions to form a single downlight fixture housing by connecting the lower and upper portions together by at least one of press fitting and/or the use of a bonding agent; and mounting the downlight to a ceiling by supporting the upper housing portion on the ceiling in a position where the lower portion of the downlight fixture housing extends through an opening in the ceiling.

2. The method of claim 1 including the additional step of forming a recess around the upper end of the lower portion and/or a recess around the lower end of the upper portion, the recess or recesses being configured to allow one of the upper or lower portions to fit within at least part of the other of the upper or lower portions.

3. The method of claim 1 in which the step of fabricating a lower portion of a downlight fixture housing includes extruding the lower portion of the downlight fixture housing.

4. The method of claim 1 in which the step of fabricating a lower portion of a downlight fixture housing includes adding design elements to the lower housing portion via machining.

5. The method of claim 1 in which the step of fabricating an upper portion of the downlight fixture housing includes die casting the upper portion of the downlight fixture housing and the step of fabricating a lower portion of the downlight fixture housing includes adding an aesthetic finish.

6. The method of claim 5 in which the step of fabricating an upper portion of the downlight fixture housing includes die casting the upper portion of the downlight fixture housing to include an at least partially closed upper end.

7. The method of claim 1 in which the step of mounting the downlight to a ceiling includes mounting the downlight to an elevator drop ceiling; and in which the method includes the additional steps of:

attaching a downlight mount to the upper portion of the downlight fixture housing; and mounting the downlight in the elevator drop ceiling by supporting the downlight mount on the elevator drop ceiling in a position that permits the removal of the lower portion of the housing from the upper portion of the housing through the opening in the elevator drop ceiling without dismounting the upper portion of the housing from the elevator drop ceiling.

8. The method of claim 1 in which:

the step of fabricating the upper portion of the downlight fixture housing additionally comprises forming a lamp mount within the upper portion, the lamp mount being shaped to removably receive a lamp; and the step of fabricating the lower portion of the downlight fixture housing additionally comprises forming the lower portion for attachment to and detachment from the upper portion after the lamp has been received by the lamp mount in the upper portion.

9. A downlight fixture housing fabrication method comprising the steps of:

fabricating a lower portion of a downlight fixture housing;

fabricating an upper portion of the downlight fixture housing;

joining the upper and lower portions to form a single downlight fixture housing by connecting the lower and upper portions using a mechanical attachment system; and mounting the downlight to a ceiling by attaching the upper housing portion to the ceiling in a position where the lower portion of the downlight fixture housing extends through an opening in the ceiling.

10. The method of claim 9 including the additional step of forming a recess around the upper end of the lower portion and/or a recess around the lower end of the upper portion, the recess or recesses being configured to allow one of the upper or lower portions to fit within at least part of the other of the upper or lower portions.

11. The method of claim 9 in which the step of fabricating a lower portion of a downlight fixture housing includes extruding the lower portion of the downlight fixture housing.

12. The method of claim 9 in which the step of fabricating a lower portion of a downlight fixture housing includes adding design elements to the lower housing portion via machining.

13. The method of claim 9 in which the step of fabricating an upper portion of the downlight fixture housing includes die casting the upper portion of the downlight fixture housing and the step of fabricating a lower portion of the downlight fixture housing includes adding an aesthetic finish.

14. The method of claim 11 in which the step of fabricating an upper portion of the downlight fixture housing includes die casting the upper portion of the downlight fixture housing to include an at least partially closed upper end.

15. The method of claim 9 in which the step of connecting the upper and lower portions comprises:

providing a mechanical attachment system comprising a pin and a pinhole formed in at least one of the upper and lower portions of the downlight fixture housing where insertion of the pin in the pinhole will resist separation of the upper and lower portions from one another; and inserting the pin at least partially into the pinhole.

16. The method of claim 9 in which the step of connecting the upper and lower portions comprises:

providing a mechanical attachment system comprising interior threads formed in an inner circumferential surface of one of the upper and lower portions of the downlight fixture housing, and exterior threads formed in an outer circumferential surface of the other of the upper and lower portions of the downlight fixture housing; and threadedly engaging the interior threads with the exterior threads.

17. The method of claim 9 in which the step of mounting the downlight to a ceiling includes mounting the downlight to an elevator drop ceiling; and in which the method including the additional steps of:

attaching a downlight mount to the upper portion of the downlight fixture housing; and mounting the downlight to the elevator drop ceiling by supporting the downlight mount on the elevator drop ceiling in a position where the upper portion of the downlight fixture housing extends above the drop ceiling and the lower portion of the downlight fixture lies flush or proud of a bottom of the drop ceiling, the housing extending through an opening in the drop ceiling, and permitting the removal of the lower portion of the housing from the upper portion of the housing through the opening in the elevator surface without dismounting the upper portion of the housing from the elevator surface.

18. The method of claim 9 in which the step of fabricating the upper portion of the downlight fixture housing additionally comprises providing a lamp mount within the upper portion, the lamp mount being shaped to removably receive and retain a lamp in the upper portion.

19. The method of claim 18 in which the step of fabricating the lower portion of the downlight fixture housing additionally comprises forming the lower portion to include lower and upper openings through which a lamp can pass and be received by, or removed from, the lamp mount in the upper portion without detaching the upper portion from the lower portion.

20. The method of claim 18 in which the step of fabricating the lower portion of the downlight fixture housing additionally comprises forming the lower portion for attachment to and detachment from the upper portion after the lamp has been received by the lamp mount in the upper portion, and without removing the lamp mount and the upper portion.

* * * * *